United States Patent
Ishidoshiro

(10) Patent No.: US 7,522,729 B2
(45) Date of Patent: Apr. 21, 2009

(54) ENCRYPTION KEY SETTING SYSTEM, ACCESS POINT, ENCRYPTION KEY SETTING METHOD, AND AUTHENTICATION CODE SETTING SYSTEM

(75) Inventor: Takashi Ishidoshiro, Nagoya (JP)

(73) Assignee: Buffalo Inc., Nagoya (JP)

( * ) Notice: Subject to any disclaimer, the term of this patent is extended or adjusted under 35 U.S.C. 154(b) by 802 days.

(21) Appl. No.: 10/983,263

(22) Filed: Nov. 4, 2004

(65) Prior Publication Data

US 2005/0201557 A1 Sep. 15, 2005

(30) Foreign Application Priority Data

Nov. 6, 2003 (JP) ............... 2003-377072

(51) Int. Cl.
*H04L 9/00* (2006.01)
(52) U.S. Cl. .................................... 380/270
(58) Field of Classification Search ................ 380/270, 380/273, 278
See application file for complete search history.

(56) References Cited

U.S. PATENT DOCUMENTS

| | | | |
|---|---|---|---|
| 6,148,205 A | 11/2000 | Cotton | |
| 7,174,157 B2 * | 2/2007 | Gassho et al. ............... | 455/410 |
| 7,289,631 B2 * | 10/2007 | Ishidoshiro ............... | 380/270 |
| 2002/0061748 A1 | 5/2002 | Nakakita et al. | |
| 2002/0115426 A1 | 8/2002 | Olson et al. | |
| 2003/0092395 A1 | 5/2003 | Gassho et al. | |
| 2004/0005057 A1 * | 1/2004 | Jang et al. ............... | 380/270 |

FOREIGN PATENT DOCUMENTS

| JP | 2001-320373 | 11/2001 |
|---|---|---|
| JP | 2001-345819 | 12/2001 |

OTHER PUBLICATIONS

European Search Report dated Mar. 15, 2005 for European Application No. EP 04256868.3.

* cited by examiner

*Primary Examiner*—Ellen Tran
(74) *Attorney, Agent, or Firm*—Beyer Law Group LLP

(57) ABSTRACT

Access point 20 starts the WEP key setting process by working registration button 127A of remote controller 30. The range reached by the electric waves transmitted from access point 20 is changed from wireless communication area AR1 which is the normal range to security communication area MR1 which is a narrower range. After that, access point 20 delivers the used WEP key to terminal 50, and after confirming delivery, registers the MAC address of terminal 50. Terminal 50 sets the delivered WEP key itself.

As a result, it is possible to realize with a simple method the new addition of terminals used for a wireless LAN while preventing leaking of data that represents the encryption key.

15 Claims, 6 Drawing Sheets ered to as the WEP
ENCRYPTION KEY SETTING SYSTEM, ACCESS POINT, ENCRYPTION KEY SETTING METHOD, AND AUTHENTICATION CODE SETTING SYSTEM

BACKGROUND OF THE INVENTION

1. Field of the Invention

The present invention relates to a technique of setting an encryption key, which is used to encrypt radio communication data transmitted between an access point as a relay station for a wireless LAN and a terminal equipped with a device for connecting with the wireless LAN prior to the transmission, in the terminal and in the access point.

2. Description of the Related Art

Access points as radio relay stations for a wireless LAN are used as the device of connecting multiple computers at separate locations to the Internet not only in the places where specific people continuously act, such as homes and offices (hereafter referred to as private spaces), but in the places where general public temporarily act, such as hotels, airports, shopping malls, parks, and stations (hereafter referred to as public spaces). One proposed technique connects an access point located in a public space with a broadband line, which ensures high-speed Internet access service, such as an xDSL line or a CATV line, and gives a space for Internet access (hereafter referred to as a free spot) to the general public in the coverage of radio wave transmitted from the access point (radio communication area). The administrator of the public space is authorized to use a certain broadband line. The broadband line is open to terminals possessed by the respective users of the public space via the access point for the wireless LAN. This enhances the convenience of the user's Internet access and increases the utilization rate of the public space.

The free space may give only limited people (for example, clients) the authorization for access to the Internet via the wireless LAN in the radio communication area. In such cases, it is required to prevent illegal access of any unauthorized person to the network. A number of people use the same free spot, and the radio waves for wireless communication are frequently transmitted between terminals possessed by the respective people and the access point. For sufficient protection of privacy of each person, it is essential to effectively prevent the contents of communication from being leaked to any third person by interception of the radio waves in the radio communication area.

Diverse security techniques for preventing illegal access to the network and leakage of communication to any third person have been proposed with regard to the wireless LAN. One proposed technique utilizes a MAC (Media Access Control) address, which is an intrinsic identification number allocated to a device for connecting the wireless LAN (for example, a wireless LAN adapter) attached to the terminal, and registers the allocated MAC address in the access point. The access point authenticates the MAC address in response to an access from the terminal, and rejects the request of access to the network from the terminal when the input MAC address is not identical with the registered MAC address. This technique is referred to as the MAC address restriction technique (for example, see Japanese Patent Laid-Open Gazette No. 2001-320373). Another proposed technique sets a WEP (Wired Equivalent Privacy) key as a common encryption key in both the terminal and the access point and encrypts the details of the data, which are transmitted between the terminal and the access point, with the WEP key. Even in the case of accidental leakage of data, the encryption makes it difficult to analyze and grasp the data. This technique is referred to as the WEP encryption technique (for example, see Japanese Patent Laid-Open Gazette No. 2001-345819).

In order to ensure the high security level of the free spot, each user who wants to utilize the free spot is required to register the MAC address and set the WEP key with regard to the terminal of the user, prior to use of the free spot.

The prior art security technique, however, requires manual registration of the MAC address in the access point and manual setting of the WEP key in the terminal, and is rather troublesome and inconvenient in the case of new enrollment of a terminal for the wireless LAN. Especially in the case of a free spot installed in a public space, there are a large number of users who want to utilize the free spot, and the number is increasing. It is extremely inconvenient and unpractical to ask each of the many users who possess own terminals to operate the terminal for registration of the MAC address and setting of the WEP key as the conditions of utilizing the free spot.

The WEP key of an arbitrary letter string set in the terminal should also be set in the access point. It is preferable to utilize the wireless LAN for the setting. The WEP key data carried on the radio wave is transmitted from the terminal to the access point by wireless. The access point receives the transmitted WEP key and sets the WEP key mapped to the terminal. The user of the terminal is then allowed to enjoy various services (for example, Internet access service) via the wireless LAN immediately after transmission of the WEP key. In the case of wireless transmission of the WEP key, however, there is a possibility of leakage of the WEP key to a third person through interception of the radio wave transmitted between the terminal and the access point. The third person who illegally obtains the leaked WEP key can analyze and grasp all the data transmitted between the access point and the terminal with the WEP key. This disables the security system based on encryption. Especially in the access point of the free spot, the WEP key is set in the terminals of many users who want to utilize the free spot. It is thus highly demanded to effectively prevent leakage of the WEP key and ensure sufficient secrecy of communication for a large number of users.

SUMMARY OF THE INVENTION

The goal of the present invention is to solve the problems noted above, and to realize with a simple method the new addition of a terminal using a wireless LAN while preventing leaking of data that represents an encryption key.

The encryption key setting system of the present invention is an encryption key setting system performing encryption with an encryption key in advance of communication of wireless communication data through wireless communication using electric waves.

The encryption key setting system comprising:
an access point which is a relay for a wireless LAN;
a terminal which is equipped with a device for wireless LAN connection;
an instruction unit that has an operating unit for remote operation to said access point and gives instructions to start setting said encryption key at said access point by operating the operating unit;
a communication range restriction module that, based on the instructions of said instruction module, restricts the wireless communication range between said access point and said terminal to be narrower than the normal communication range; and
an encryption key setting module that, when the wireless communication range is restricted by said communication range restriction module, sets said encryption key by doing wireless communication of encryption key data that represents the contents of said encryption key between terminals that exist within said communication range and said access point.

To be able to perform wireless communication between a terminal and the access point, the aforementioned wireless LAN connection device is a device that is mounted on the terminal. Examples of this wireless LAN connection device could include a wireless LAN adapter or wireless LAN card.

With the encryption key setting system of the present invention, setting of the encryption key that is used when encrypting wireless communication data communicated between an access point and a terminal is started by operating the operating unit that is provided on a device for which remote operation is possible in relation to said access point. This kind of encryption key setting is performed by wireless communication of encryption key data that represents the contents of the encryption key between said terminal and said access point when the wireless communication range between the access point and the terminal is made narrower than the normal communication range. By doing this, even when encryption key data is sent by wireless communication, the encryption key data is exchanged in a restricted range that is centered at the access point, so it is more difficult to have interception of wireless on which the encryption key data was traveling, thus preventing leaking of encryption key data. Therefore, it is possible to easily realize new addition of terminals which use a wireless LAN while preventing leaking of encryption key data, and to realize a wireless LAN which is easy to subscribe to but which has a high security level.

A variety of embodiments can be considered as embodiments for realizing a communication range restriction module. For example, it is also possible to realize this on the access point side. If realized using the access point, when there is an instruction to start encryption key setting, the wireless communication range is narrowed and the encryption key is set under the conditions decided based on this instruction. Therefore, it is not necessary to always have the access point in a state of receiving encryption key settings. Moreover, as the aforementioned instruction module, there are items like ones that perform instructions by operation of a device for which remote operation is possible by wireless communication of electric waves to the access point such as with a terminal equipped with a wireless LAN connection device or a remote controller.

Control can be performed to make the wireless communication range narrower than the normal communication range when the access point receives instructions to the effect of setting an encryption key from said terminal, and control can be performed to return the wireless communication range to the normal communication range when the encryption key setting by said wireless setting module is completed. By doing this, it becomes possible for the owner of the terminal to make encryption key settings without touching the access point. It is also possible to have the communication range restriction module be a module that restricts said wireless communication range by adjusting the transmission output of said access point.

It is also possible to have the communication range restriction module be a shielding body that shields the terminal and access point for which said encryption key setting is performed in relation to said wireless signal. By doing this, wireless on which encryption key data was traveling (hereafter called encryption key wireless) is sent outside the shielding body, so there is secure prevention of infiltration inside the shielding body due to encryption key wireless interception. Therefore, it is possible to sufficiently prevent leaking of encryption key data to a third party.

The access point can also be equipped with a registration module that registers information that is inherent to the terminal that is subject to communication. By doing this, it is possible to allow connection to a wireless LAN only for terminals for which inherent information is registered, and to prevent connection to a wireless LAN by entities without connection authority. It is also possible to prevent beforehand the acquisition of various types of data such as encryption key data by an entity without connection authority infiltrating a terminal or access point on a LAN. In this case, by using a structure that duplicates the module of registering inherent information and transferring one of these to the access point using a wireless module other than electric waves, it is possible to further increase the safety level of registration.

The present invention can also be understood as an access point or encryption key setting method. Furthermore, the present invention can be realized as an authentication code setting system. The concerned authentication code setting system is a system that sets the authentication code, which is required when a terminal which is equipped with a device for wireless LAN connection accesses specific data on a network by wireless communication using electric waves at an access point that is a relay for a wireless LAN, in at least one or the other of said terminals or said access point. The authentication code setting system comprises:

an instruction module that gives instructions to start the setting of said authentication code to said access point by operating an operating unit which is a device for which wireless remote operation is possible in relation to said access point, a range restricting module that restricts the wireless communication range between said access point and said terminals to be narrower than the normal communication range based on the instructions of said instruction module; and a setting module that sets said authentication code between terminals that exist within said communication range and said access point by wireless communication of data that represents the contents of said authentication code when the wireless communication range has been restricted by said communication range restriction module.

As the aforementioned authentication code, possibilities include the individual information required for obtaining pay information from an access point (e.g. name of the terminal owner, or password, etc.), etc.

The authentication code setting system of the present invention sets the authentication code, which is required when a terminal accesses specific data on a network by wireless communication at an access point, in at least one or the other of said terminal or said access point. This kind of authentication code setting is started by operating an operating unit provided in a device that is capable of remote operation in relation to said access point, and when the wireless communication range between the access point and terminal is narrower than the normal communication range, this is performed by wireless communication of data that represents the contents of the authentication code (hereafter called authentication code data) between said terminal and said access point. By doing this, even when authentication code data is sent by wireless communication, the authentication code data is exchanged in a restricted range that is centered at the access point, so it is more difficult to have interception of wireless on which the authentication code data was traveling, thus preventing leaking of authentication code data. Therefore, it is possible to easily realize new addition of terminals which use a wireless LAN while preventing leaking of authentication code data, and to realize a wireless LAN which has a high security level.

DESCRIPTION OF THE PREFERRED EMBODIMENTS

To further clarify the structure and effect of the present invention explained above, embodiments of the present invention are explained in the sequence below.

A. First Working Example (Encryption Key Setting System LH1)
A-1. Summary of Encryption Key Setting System LH1
A-2. Contents of Processing Related to WEP Key Setting
A-3. Functions and Effects B. Second Working Example (Encryption Key Setting System LH2)

C. Variation Example

A. Working Example

Figure 1:
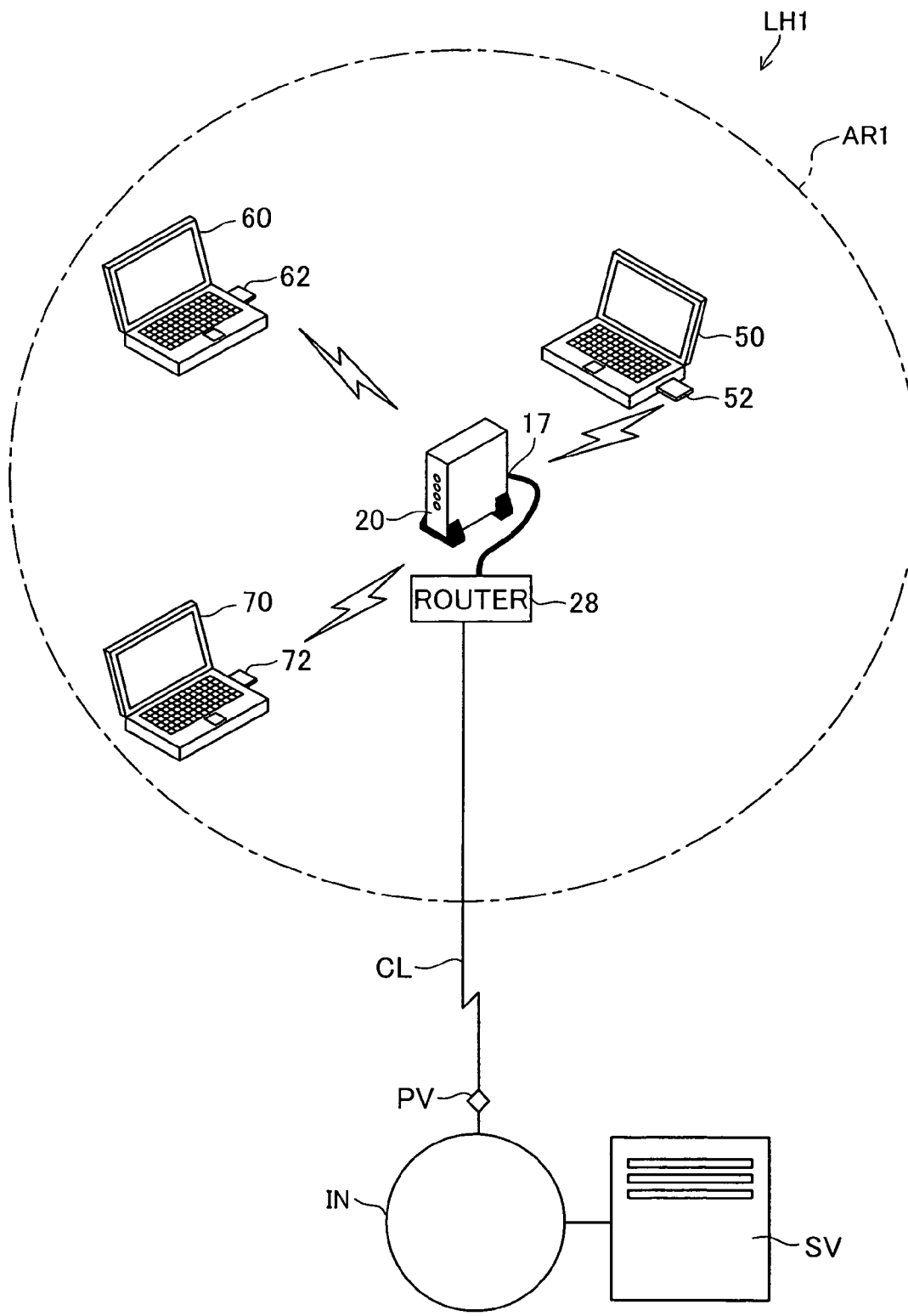
FIG. 1 is an explanatory diagram that shows the structure of hardware that realizes encryption key setting system LH1 which is a first working example of the present invention.
Figure 2:
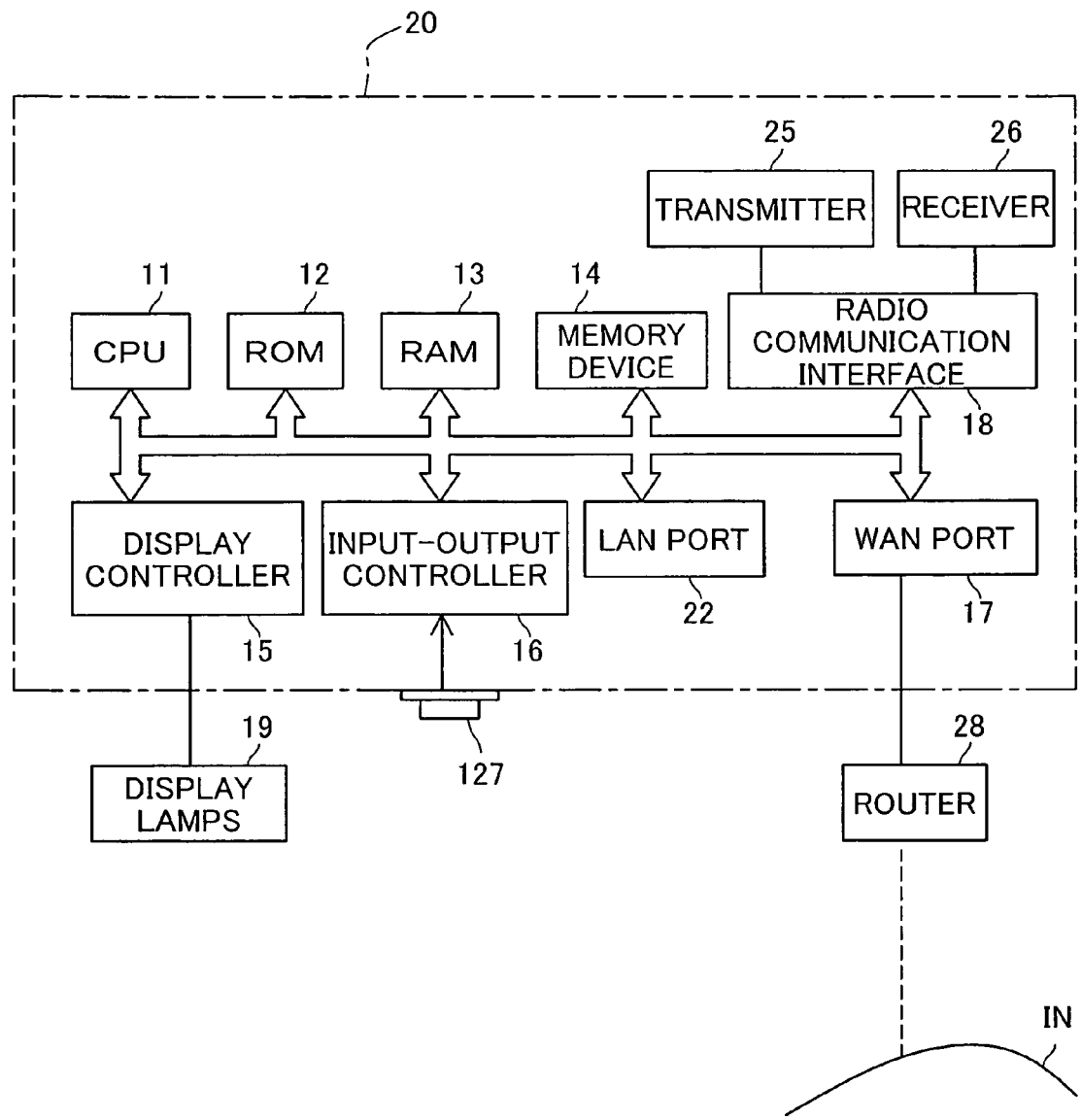
FIG. 2 is an explanatory diagram that shows the structure of access point 20.

A-1. Summary of Encryption Key Setting System LH1:

FIG. 1 is an explanatory diagram that shows the structure of hardware that realizes encryption key setting system LH1 which is a first working example of the present invention, and FIG. 2 is an explanatory diagram that shows the structure of access point 20. Encryption key setting system LH1 is a system that, by performing wireless communication between terminal 50 and access point 20 within wireless communication area AR1 of a wireless LAN with key data that represents the contents of the WEP key as the encryption key traveling on an electric wave, sets the WEP key that access point 20 uses for terminal 50.

As shown in FIG. 1, access point (wireless base station) 20 which is a relay for a wireless LAN is installed in wireless communication area AR1. As shown in FIG. 2, access point 20 comprises various parts such as CPU 11, ROM 12, RAM 13, non-volatile memory device such as a hard disk 14, WAN port 17 as a network interface, LAN port 22 as a connection to a wired LAN, radio communication interface 18, display controller 15, and input/output controller 16, etc. which are mutually connected by a bus to this CPU 11.

Figure 6A:
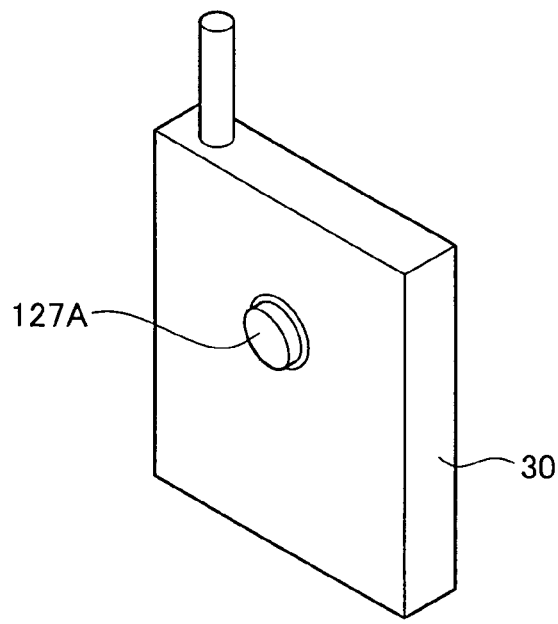
FIG. 6A is an explanatory diagram that shows an embodiment of a remote controller 30 which is equipped with a registration button 127A.
Figure 6B:
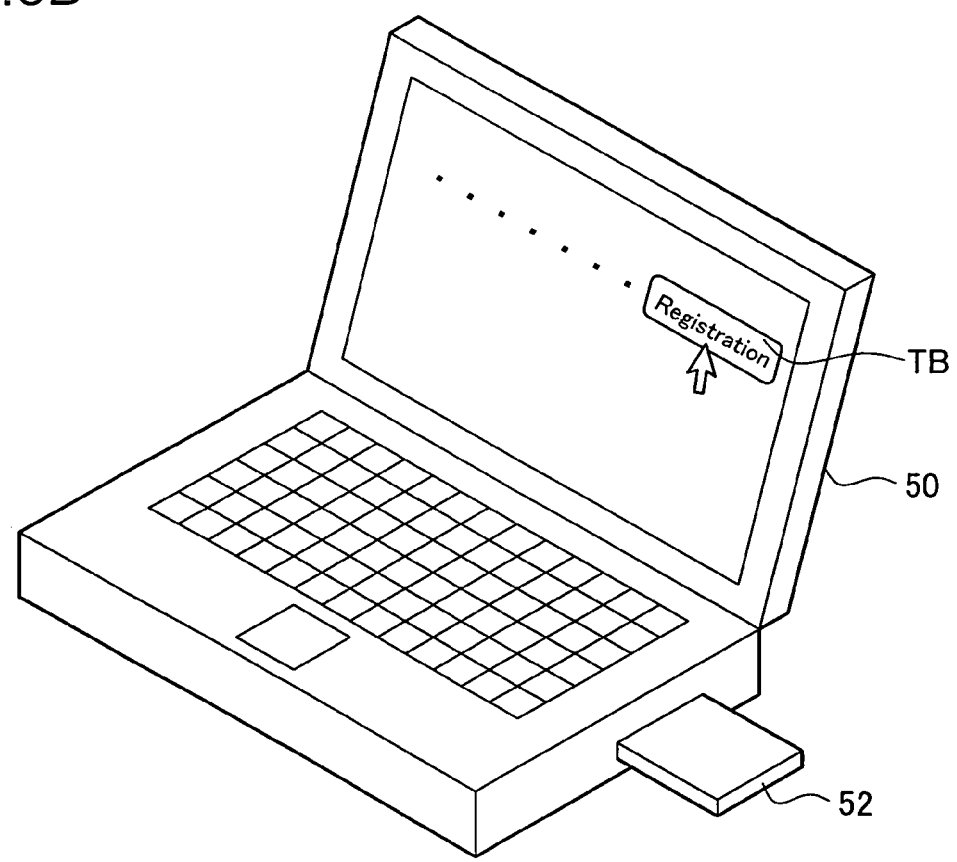
FIG. 6B is an explanatory diagram that shows an embodiment of terminal 50 which realizes registration button TB.

The ROM 12 stores diverse programs relating to communication with terminals 50, 60, and 70 in the radio communication area AR1 and connection to the Internet IN, as well as data required for execution of these programs. A push-type registration button 127 is linked with the input-output controller 16. The registration button 127 has a pressing element exposed to the surface of the casing of the access point 20. The display controller 15 is linked with various display lamps 19 to show the connection status and the communication status of the wireless LAN by lighting or flashing on and off. Also, with this working example, a remote controller 30 with a registration button 127A like that shown in FIG. 6A is prepared. Even if a dedicated remote controller 30 is not provided, it is possible to realize this with a registration button TB realized by a program in terminal 50 that is equipped with a wireless LAN connection device 52 as shown in FIG. 6B. The structure is such that issuing of specific data from these devices is performed when a touch operation of the button or key equipped on said device (e.g. pressing operation of registration button 127A shown in FIG. 6A) or a selection operation of a selection choice on a screen equipped on said device (e.g. clicking of the registration tab TB displayed on the screen in terminal 50 shown in FIG. 6B), etc. is performed.

A transmitter 25 for transmitting radio waves and a receiver 26 for receiving radio waves are connected with the radio communication interface 18. The transmitter 25 and the receiver 26 are built in the access point 20 in a radio-wave transmittable state to the outside and in a radio-wave receivable state from the outside, respectively. In the system of FIG. 1, the radio communication area AR1 represents the coverage of the radio wave transmitted from the transmitter 25 and of the radio wave transmitted from the terminal 50, 60, and 70 and received by the receiver 26, in the case where standard values are set to the output of the transmitter 25 and to the reception sensitivity of the receiver 26. Setting the access point 20 constructs a wireless LAN having the radio communication area AR1 as the general communication range.

An output changing program and a reception sensitivity changing program have been stored in advance as programs relating to communication with the terminal 50, 60, and 70 in the ROM 12. The output changing program describes a series of processing to temporarily change the standard setting value of the output of the transmitter 25. The reception sensitivity changing program describes a series of processing to temporarily change the standard setting value of the reception sensitivity of the receiver 26. The setting value is changed by an operation of multiplying the current standard setting value by 1/n (where n is a preset constant). The CPU 11 executes the output changing program and the reception sensitivity changing program and transfers the changed values of the output and the reception sensitivity to the transmitter 25 and the receiver 26 via the radio communication interface 18. This process accordingly changes the output of radio wave transmitted from the transmitter 25 and the reception density of radio wave in the receiver 26.

Each of the terminals 50, 60, and 70 is a known book-type personal computer and has a control unit including a CPU, a ROM, and a RAM and a storage unit, such as a hard disk and a CD-ROM drive. This is, however, not restrictive at all, and a personal digital assistant, a portable terminal, or any other equivalent device is applicable for each of the terminals 50, 60, and 70.

Wireless LAN adapters 52, 62, and 72 are respectively attached to the terminals 50, 60, and 70 as the device for connecting with the wireless LAN to allow transmission of radio wave to and from the access point 20. A device driver of each wireless LAN adapter 52, 62, or 72 is incorporated in the corresponding terminal 50, 60, or 70, so that the terminal 50, 60 or 70 can recognize the wireless LAN adapter 52, 62, or 72 attached thereto and control the attached wireless LAN adapter 52, 62, or 72. A MAC address as an intrinsic identification number is allocated to each of the wireless LAN adapters 52, 62, and 72.

The terminal 50, 60, or 70, which is a computer entering the radio communication area AR1, establishes wireless communication with the access point 20 via transmission of radio waves between the wireless LAN adapter 52, 62, or 72 attached to the terminal 50, 60, or 70 and the access point 20. The access point 20 and the wireless LAN adapter 52, 62, or 72 are capable of converting the data to be transmitted to a format suitable for communication, that is, packets. This theoretically allows for offline (in the state of no connection with the Internet) data transmission between the terminal 50, 60, or 70 and the access point 20.

The structure of connecting the access point 20 with the Internet IN is discussed below. As shown in FIG. 1, a router 28 with a built-in modem is linked with the WAN port 17 of the access point 20 via a cable. The router 28 identifies and discriminates each of the multiple terminals 50, 60, and 70 included in the wireless LAN from the other terminals, based on the MAC addresses respectively allocated to the wireless LAN adapters 52, 62, and 72.

The built-in modem of the router 28 is connected to the Internet IN via a broadband communication line CL, such as a CATV line or an xDSL line, and an exclusive line of a provider PV. The router 28 accordingly functions as a gateway to connect the wireless LAN with the Internet IN.

In this embodiment, the access point 20 allows a terminal having the MAC address registered in the access point 20 (hereafter referred to as registered terminal) to gain access to the wireless LAN, among the terminals with wireless LAN adapters possessed by the users in the radio communication area AR1. The user of the registered terminal connects the terminal to the Internet IN via the access point 20 to fetch diverse pieces of information, such as Web contents, stored in a server SV on the Internet IN. The access point 20, on the other hand, does not allow any terminal having the MAC address unregistered in the access point 20 (hereafter referred to as unregistered terminal) to gain access to the wireless LAN, even when the terminal enters the radio communication area AR1. Namely the radio communication area AR1 functions as a free spot that provides only the users of the registered terminals with the access service to the Internet IN. In the system of FIG. 1, the terminals 50 and 60 are registered terminals, whereas the terminal 70 is an unregistered terminal.

Data representing the details of various contracts, services, and the like (hereafter referred to as detailed data) are carried on the radio wave and are transmitted between the registered terminal and the access point 20. In the system of this embodiment, a transmitter device of transmitting the detailed data (either the registered terminal or the access point 20) encrypts the detailed data with an encryption key or a WEP key discussed previously, prior to the transmission, and transmits the encrypted detailed data (hereafter referred to as encrypted data) to a receiver device (either the access point 20 or the registered terminal). The receiver device decrypts the received encrypted data with the WEP key, so as to obtain the detailed data.

The WEP represents a secret key encryption method (this method uses an identical encryption key for encrypting data and for decrypting the encrypted data) in conformity with the IEEE 802.11 standard. The encryption key may be a 64-bit WEP key or a 128-bit WEP key.

Even when the radio wave with the detailed data carried thereon is intercepted in the radio communication area AR1, such encryption with the WEP key makes analysis of the detailed data difficult and thus effectively prevents leakage of the details of the communication to any third person. For example, in the case where a contract document including a credit card number is transmitted from a registered terminal to the access point 20, this arrangement effectively prevents the credit card number from being leaked to any third person through interception of the transmitted radio wave.

A-2. Series of Processing to Set WEP Key

The following describes a technique of setting the WEP key in the terminals 50 and 60.

A program of registering the MAC addresses of the wireless LAN adapters 52 and 62 (MAC registration program) has been stored in advance as a program relating to communication with the terminals 50 and 60 in the ROM 12 of the access point 20. A utility program of the wireless LAN installed in each of the terminals 50 and 60 includes a program of setting the WEP key (WEP key setting program).

Figure 3:
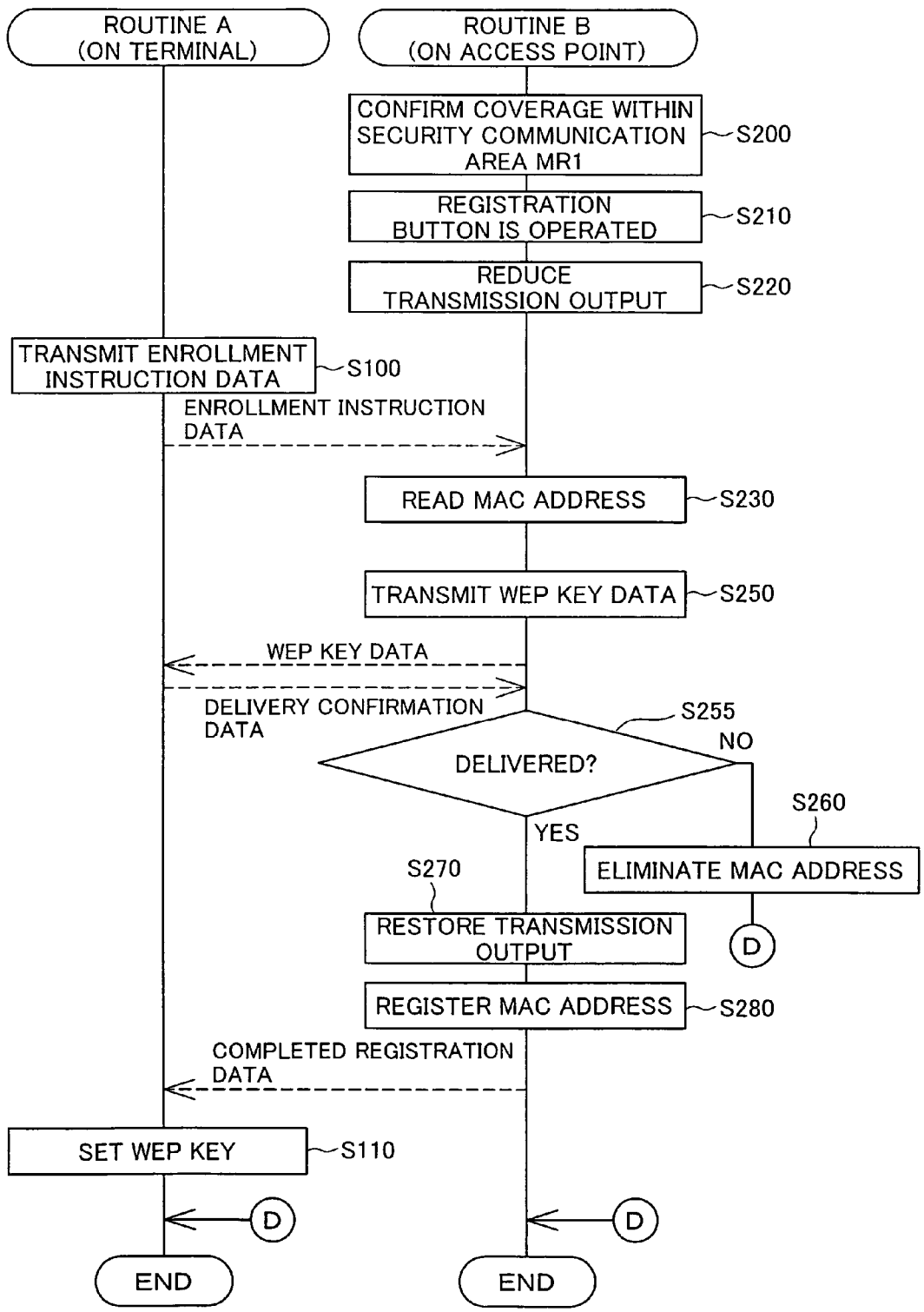
FIG. 3 is a flow chart that shows a security data setting processing routine.

The CPU of the terminal 50 or 60 executes the WEP key setting program, while the CPU 11 of the access point 20 executes the MAC registration program and the output changing program, so as to implement a security data setting process shown in the flowchart of FIG. 3. The security data setting process registers the MAC addresses of the wireless LAN adapters 52 and 62 in the access point 20 and sets a common WEP key in the access point 20 and the terminal 50 or 60.

Figure 4:
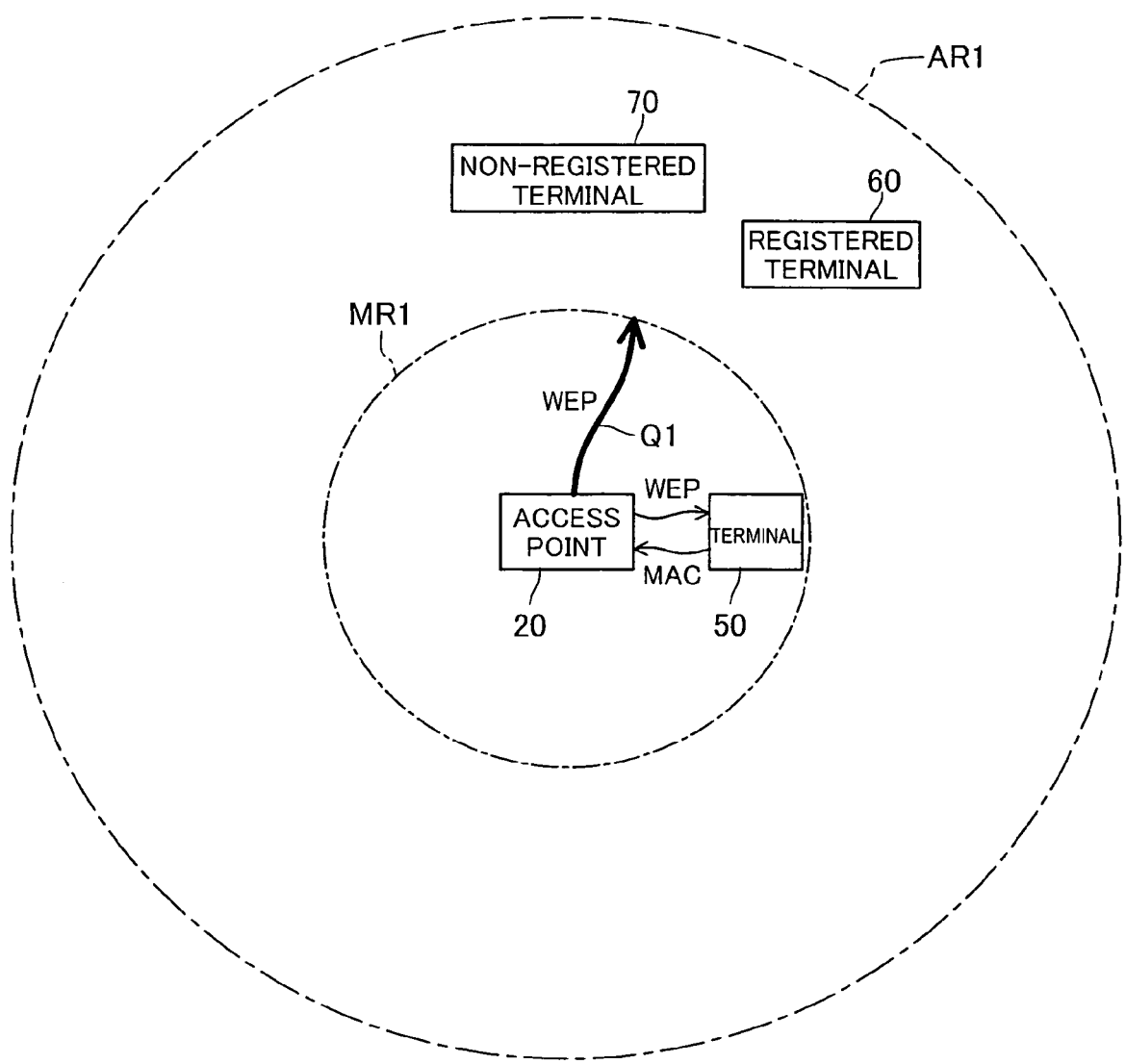
FIG. 4 is an explanatory diagram that shows, as security communication area MR1, the range for which electric waves can be transmitted for transmitter 25 after the output value is changed
Figure 5:
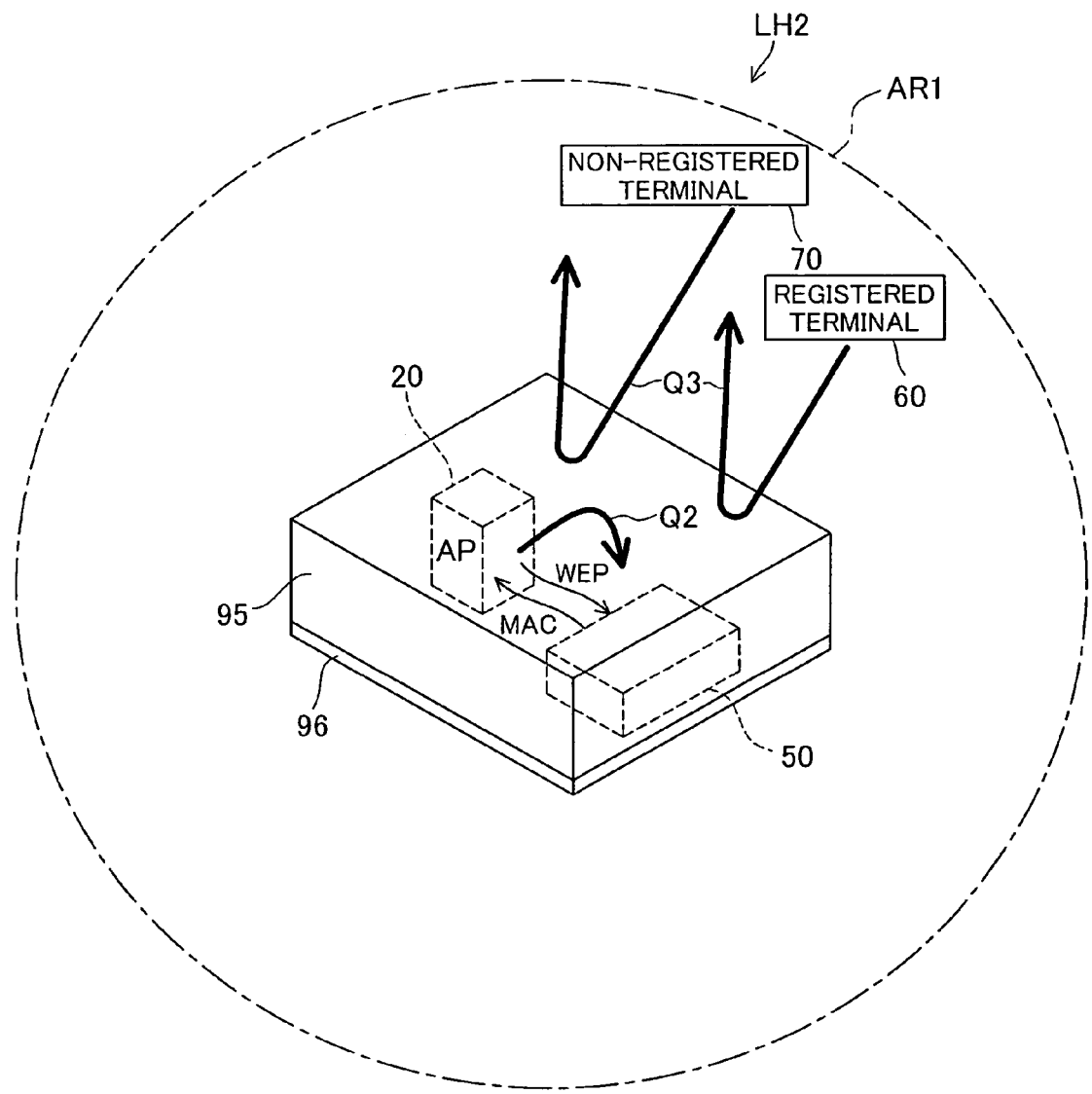
FIG. 5 is an explanatory diagram that shows the device structure that realizes encryption key setting system LH2 which is a second working example of the present invention.

The security data setting process is discussed in detail with reference to FIGS. 3 and 4. FIG. 3 is a flowchart showing a security data setting routine. FIG. 4 shows a radio wave transmittable range of the transmitter 25 after a change in output, as a security communication area MR1. In the following description with FIGS. 3 and 4, it is assumed that the terminal 50 is the object of registration of the MAC address and the object of setting of the WEP key.

The security data setting routine includes a routine A executed by the CPU of the terminal 50 and a routine B executed by the CPU 11 of the access point 20. The administrator of the access point 20 confirms that the terminal 50 is located within the security communication area MR1 (step S200) and operates the registration button 127 (step S210). The security communication area MR1 represents a transmittable range of the radio wave from the transmitter 25, when the standard setting value is temporarily lowered by execution of the output changing program discussed previously (see FIG. 4). In response to the operation of the registration button 127, the access point 20 executes the output changing program and lowers the output of the transmitter 25 to 1/n of the standard setting value (step S220). This process restricts the radio wave transmittable range of the transmitter 25 to the security communication area MR1 shown in FIG. 4, which is narrower than the radio communication area AR1. The registered terminal that enters the radio communication area AR1 but is not located within the security communication area MR1 is thus not allowed to gain access to the access point 20.

The terminal 50 specifies the MAC address of the wireless LAN adapter 52 and transmits a packet, which includes data representing an instruction of new enrollment for the wireless LAN (hereafter referred to as enrollment instruction) and the MAC address attached to the data as header information, to the access point 20 (step S100).

The access point 20 reads the MAC address from the header information of the received packet and temporarily stores the MAC address into a buffer area of the RAM 13 (step S230).

The access point 20 subsequently transmits data representing a selected WEP key for use (hereafter referred to as WEP key data) to the terminal 50 (step S250), and determines whether or not the WEP key data has been delivered to the terminal 50 successively (step S255). The decision of successful delivery is carried out by utilizing a data return function of the wireless LAN adapter 52. In the case of failed delivery of the WEP key data to the terminal 50, the access point 20 eliminates the MAC address stored in the RAM 13 (step S260) and exits from the routine B.

In the case of successful delivery of the WEP key data to the terminal 50, on the other hand, the access point 20 executes the output changing program and restores the output of the transmitter 25 to the standard setting value (step S270). This process restores the radio wave transmittable range of the transmitter 25 to the general range (the radio communication area AR1). The registered terminal entering the radio communication area AR1 is thus allowed to gain access to the access point 20.

The access point 20 then registers the MAC address of the terminal 50 into a management region of the storage device 14 (step S280). This completes registration of the MAC address of the terminal 50 in the access point 20.

The terminal 50 receives the WEP key data delivered at step S250 and automatically sets the WEP key mapped to the IP address of the access point 20 (step S110). The terminal 50 then exits from the routine A. This completes setting of the WEP key mapped to the access point 20 in the terminal 50. After the registration of the MAC address and the setting of the WEP key, the detailed data are encrypted with the preset WEP key and the encrypted data are transmitted between the terminal 50 and the access point 20.

A-3. Functions and Effects

With the encryption key setting system LH1 of the first working example explained above, by executing the aforementioned security data setting processing, the WEP key is automatically set in terminal 50. When this kind of "automatic setting of the WEP key by wireless communication" is performed, it becomes possible to easily realize new addition of a terminal 50 that uses the wireless LAN, and to provide a wireless LAN that is easy to subscribe to. For example, when setting the WEP key, the owner of terminal 50 and the administrator of access point 20 do not have to connect terminal 50 and access point 20 using a cable, etc., and do not have to perform a manual task of creating or setting the WEP key. It is especially preferable to use a wireless LAN for which the aforementioned encryption key setting system LH1 is installed in a free spot. A free spot wireless LAN can have many people subscribe one after another who wish to use this LAN, because it is possible to greatly reduce the work required for making settings for each person.

Furthermore, when placing the WEP key data on electric waves and sending it to terminal 50, access point 20 changes the range for which electric waves sent from access point 20 reach from wireless communication area AR1 which is a normal range to a security communication area MR1 which is a narrower range. Because of this, there is a lower possibility of electric waves on which WEP key data is placed being intercepted. For example, in FIG. 4, when WEP key data is transmitted from access point 20 to terminal 50, electric waves on which WEP key data is placed only reach within security communication area MR1 which is a narrower range (see arrow Q1), and they are not received at registered terminal 60 or non-registered terminal 70 which are outside security communication area MR1. Therefore, even in a case like the above in which WEP key data undergoes wireless transmission, it is possible to prevent WEP key leakage, and to realize a wireless LAN with a high security level. In particular, in this kind of case when access point 20 is installed in a free spot, for terminals of the many people who try to use the free spot, there is sure prevention of leaking of the WEP key leaking to a third party during setting of the WEP key. Therefore, it is possible to perfectly secure the secrecy of communication of each of the many users.

Also, with the encryption key setting system LH1 of the first working example, access point 20 restricts the communication range temporarily according to receipt of data that represents subscriber instructions from terminal 50 and creates a WEP key, and after the created WEP key is transmitted to terminal 50, returns the communication range to its original state. Therefore, the owner of terminal 50 can perform WEP key setting without touching access point 20, which is easy and hygienic.

With the encryption key setting system LH1 of the first working example, access point 20 registers the terminal side MAC address together with the WEP key setting, and allows connection to the wireless LAN only for registered terminals 50 and 60. By doing this, it is possible to prevent connection to a wireless LAN by an unregistered terminal 70 by using a simple method. It is also possible to prevent in advance the infiltration by unregistered terminal 70 to registered terminals 50 and 60 and access point 20 on the LAN and therefore acquisition of various types of data such as the WEP key data.

In the first working example noted above, as the period for narrowing the communication range, possibilities include (a) while registration button 127A is being pressed, (b) from when registration button 127A is pressed until the MAC address and WEP key are registered, and (c) from when registration button 127A is pressed until it is pressed again, etc.

Moreover, when using a registration button TB of terminal 50 on which wireless LAN adapter 52 is mounted for a specified device, it is acceptable to have the aforementioned process started by access point 20 by operating registration button TB, sending a predetermined signal, and having access point 20 receive this, but it is also possible to have access point 20 change to the registration mode when it receives data that represents subscribing instructions from terminal 50. In this case, it is also possible to determine that said terminal 50 is within security communication area MR1 during the communication reply time.

With the structure noted above, the terminal owner and access point administrator can perform WEP setting without touching the access point side registration point 127, etc., and to increase the degree of freedom of the access point installation position. For example, even when the access point is installed in a location that is difficult to reach by hand (e.g. the ceiling of a store), it is possible to smoothly perform setting of the WEP key with the terminal by using remote controller 30 or terminal 50.

B. Second Working Example (Encryption Key Setting System Lh2)

Next, we will explain a second working example. With the first working example, prevention of interception of electric waves on which WEP key data is placed was prevented using a software method of temporarily narrowing the communication range when setting the WEP key. In contrast to this, with the encryption key setting system LH2 of the second working example, prevention of interception of electric waves on which WEP key data is placed is prevented using a hardware method of "a shielding box 95 that covers access point 20 and terminal 50."

FIG. 6 is an explanatory diagram that shows the structure of a device that realizes encryption key setting system LH2 which is a second working example of the present invention.

Access point 20 and terminals 50, 60, and 70 have approximately the same structure as the first working example, and the same wireless communication area AR1 is formed as that of the first working example by this access point 20. As shown in FIG. 6, access point 20 and terminal 50 are placed on sole plate 96. On this sole plate 96, a shielding box 95 which has an empty part that can be subsumed is made to cover access point 20 and terminal 50. Shielding box 95 and sole plate 96 are formed using a metal such as iron, etc.

With the second working example, setting of the WEP key is performed using the following procedure. First, the person wishing to subscribe to the wireless LAN goes to the location at which access point 20 is installed, and places terminal 50 which he owns and access point 20 on sole plate 96. At this time, it is also permissible to have access point 20 placed on sole plate 96 ahead of time. Next, the person who wishes to subscribe to the wireless LAN operates terminal 50 and gives instructions to the effect to subscribe to the wireless LAN, and after that covers shielding box 95 on sole plate 96. Access point 20 receives data that represents subscribing instructions from terminal 50, and after a specified time from said receiving has elapsed (the time required to cover shielding box 95, for example), the same MAC address registration process and WEP key setting process as that of the first working example (the processes of step S100, step S230, -step S260, step S280, and step S110) are performed. By doing this, the registration of the MAC address relating to terminal 50 is completed on the access point 20 side, the WEP key data created by access point 20 is transmitted to terminal 50, and WEP key setting to terminal 50 is completed.

With the encryption key setting system LH2 of the second working example explained above, when the WEP key is set, the terminal 50 and access point 20 which exchange WEP key data are shielded by shielding box 95. Because of this, it is possible to surely prohibit interception of electric waves on which WEP key data is placed. For example, in FIG. 6, when WEP key data is transmitted from access point 20 to terminal 50, electric waves on which WEP key data is placed cannot pass through shielding box 95 (see arrow Q2), so there is no receiving of this at registered terminal 60 or unregistered terminal 70 within wireless communication area AR1. Also, even when registered terminal 60 or unregistered terminal 70 within wireless communication area AR1 attempt to intercept electric waves on which WEP key data is placed, the electric waves cannot pass through shielding box 95 (see arrow Q3), so it is not possible to catch electric waves on which WEP key data is placed. Therefore, even when sending WEP key data by wireless transmission, it is possible to prevent leaking of WEP key data, and to realize a wireless LAN with a high security level.

C. Variation Example

Above, we explained an embodiment of the present invention based on a working example, but the present invention is not limited to this kind of working example, and of course it is possible to use a variety of embodiments within a range that does not stray from the gist of the present invention.

For example, with the working example noted above, it is also possible to use a structure whereby an external antenna is connected by wire to access point 20, and to perform MAC address registration and WEP key setting by wireless communication between the external antenna and terminal 50. By doing this, it is possible to increase the degree of freedom of the installation location of access point 20. For example, while installing an external antenna in the corner of a store and having the WEP key setting location near the external antenna, it is possible to install access point 20 in the center of the store and broadly secure a wireless communication area within the overall store interior.

With the aforementioned working examples, WEP was used as the technology for encrypting the contents of data exchanged between terminals and an access point, but it is also permissible to use another encryption technology other than WEP. For example, an encryption technology that is a publicly announced key encryption method (a method that uses different encryption keys for data encryption and decryption of encrypted data) can also be used. We can also consider using WPA (Wi-Fi Protected Access) that is encryption technology with a higher level of strength than WEP.

With the working examples noted above, WEP key setting was realized sending and receiving of electric waves between wireless LAN adapter 52 mounted on terminal 50 and the transmitter 25 and receiver 26 of access point 20, but it is also permissible to use a structure that performs EP key setting using communication that uses other wireless than this kind of electric wave. As this other kind of wireless, possibilities include infrared rays, light, voice signals, ultrasonic waves, and weak electric signals, etc. It is also possible to realize wireless communication between terminal 50 and access point 20 using a short distance wireless communication method called Bluetooth (trademark).

It is also permissible to use another wireless such as that noted above together for the structure of the aforementioned working example data transmission. As one example, we will explain hereafter a structure that uses together data transmission using infrared rays. The points of difference with the structure of the aforementioned working examples are the points that an infrared ray receiving interface mutually connected by a bus with CPU 11 and an infrared ray receiver connected to the infrared ray receiving interface are provided on access point 20, and the point that an infrared ray transmitting interface mutually connected by a bus with the CPU and an infrared ray transmitter connected to the infrared ray transmission interface are provided on terminal 50.

The infrared ray receiver on the access point 20 side is formed from a photo diode that has sensitivity to the infrared ray area, and the infrared ray transmitter on the terminal 50 side is formed by an LED that outputs light of infrared ray area wavelengths. The infrared ray transmission interface on the terminal 50 side converts the command signal from the CPU to a transmission wave for which this command signal is overlapped. The converted transmission wave is dispatched from the infrared ray dispatcher. When terminal 50 is inside the security receiving area SR1 (area for which transmission waves can be received by the infrared ray receiver), transmission waves dispatched from terminal 50 in this way are received by the infrared ray receiver on the access point 20 side. The infrared ray receiver interface that accepts transmission waves received in this way converts the transmission waves to binarized command signals, and sends the command signals after conversion to CPU 11.

Setting of the WEP key by terminal 50 and access point 20 structured in this way is performed by executing the security data setting processing routine noted above, but the contents of the executed security data setting processing routine differ from those of the working examples noted above in terms of the following points (p) through (s).

(p) In the processing of steps S200 and S210 on the access point 20 side, the access point 20 administrator confirms that terminal 50 is within security communication area MR1 and within security receiving area SR1, and then operates registration button 127.

(q) In the processing of step S100 on the terminal 50 side, a packet that has MAC address information is transmitted from wireless LAN adapter 52 to access point 20 and a transmission wave on which the MAC address information has been superimposed is dispatched from an infrared ray dispatcher to access point 20.

(r) In the processing of step S230 on the access point 20 side, access point 20 reads the MAC address respectively from the packet received by receiver 26 and the transmission wave received by the infrared ray receiver, and temporarily stores the two read MAC addresses in RAM 13.

(s) After execution of the processing of step S230 noted in (r), the two read MAC addresses are checked, and as long as the two MAC addresses match, the processing of step S250 (process of transmitting WEP key data to terminal 50) is executed.

With this kind of processing, before the WEP key is set, the terminal 50 side MAC address is confirmed by checking two systems of information, electric waves and infrared rays. Therefore, it is possible to do a stricter check of terminals to allow to connect to the wireless LAN, and to completely prevent connection to the wireless LAN by unregistered terminals. In particular, when using infrared rays or light, infrared rays and light have directivity, so the range for which it is possible for transmission waves to reach the access point is more limited than electric waves. Therefore, it is possible to prevent a third party from illicitly using another person's MAC address to register his own terminal using said MAC address to access point 20.

Moreover, the aforementioned infrared ray transmission interface and infrared ray receiver can also be realized by incorporating these in advance into terminal 50, and can also be realized by connecting the infrared ray dispatcher to the voice output terminal of terminal 50.

Above, we explained a structure that uses together data transmission by infrared rays for data transmission using electric waves as one example, but it is also permissible to use together for data communication using electric waves data transmission using other wireless besides infrared rays (e.g. light, voice signals, ultrasonic waves, weak electric waves). When using together data transmission using visible light, it is also possible to use as the light emitting element the liquid crystal display unit of a personal computer or a portable information terminal, etc. By doing this, it is possible to dispatch a light signal on which the MAC address signal is superimposed from the liquid crystal display unit of the terminal to access point 20.

Also, with the working example noted above, the wireless communication range during setting of the WEP key was limited, but this kind of wireless communication range limitation can be applied not only to the WEP key but also to other information that is set by exchange between access point 20 and terminal 50. For example, in a free spot for which paid contents are transmitted only to a specific person, there are cases when information for authenticating that the owner of the accessed terminal is the specified person (e.g. the terminal owner name, ID, or password, etc.) is registered in advance with access point 20 or terminal 50. It is also possible to use a structure that performs this registration of information that authenticates an individual by wireless communication while limiting the wireless communication range between access point 20 and terminal 50. By doing this, there is no need to manually set information that authenticates an individual such as an ID or password, etc.

What is claimed is:

1. An encryption key setting system performing encryption, with an encryption key, in advance of communication of wireless communication data through wireless communication using electric waves, said encryption key setting system comprising:
    an access point which is a relay for a wireless LAN; and
    a terminal which is equipped with a device for wireless LAN connection and comprises a registration button (TB) for: remote connection to said access point and giving instructions to start setting said encryption key at said access point by operating the registration button (TB);
    wherein the access point comprises: a communication range restriction module that restricts the wireless communication range between said access point and said terminal to be narrower than the normal communication range and;
    an encryption key setting module that, when the wireless communication range is restricted by said communication range restriction module, sets said encryption key by wirelessly communicating encryption key data, created by the access point, and representing the contents of said encryption key, between terminals that exist within said communication range and said access point, and wherein the encryption key setting module sets said encryption key by:
    transmitting data representing a selected WEP key for use by the terminal; and
    determining whether the WEP key data has been successfully delivered to the terminal by utilizing a data return function of said terminal.

2. The encryption key setting system in accordance with claim 1 further comprising:
    a condition deciding module that decides conditions that restricts said wireless communication range to be narrower than the normal communication range based on the instructions of said instruction module,
    wherein said communication range restriction module restricts said wireless communication range while the conditions decided by said condition deciding module is detected.

3. The encryption key setting system in accordance with claim 1 or 2, wherein said communication range restriction module comprises:
    first means that performs control to restrict the wireless communication range to be narrower than the normal communication range when said access point receives instructions to the effect of setting an encryption key from said terminal; and
    second means that performs control to set back the wireless communication range to the normal communication range when the encryption key setting by said encryption key setting module is completed.

4. The encryption key setting system in accordance with claim 1, wherein said communication range restriction module restricts said wireless communication range by adjusting the transmission output of said access point.

5. The encryption key setting system in accordance with claim 1, wherein said communication range restriction module has a shielding body that shields the terminal and access point for which said encryption key setting is performed in relation to said wireless signal.

6. The encryption key setting system in accordance with claim 1, wherein said access point is equipped with a registration module that registers information that is inherent to the terminal that is subject to communication.

7. The encryption key setting system in accordance with claim 1, wherein said encryption key setting module comprises:

an inherent information receiving module that receives said information inherent to a terminal by said wireless communication in advance of wireless communication of said encryption key data by electric waves; and a terminal identification module that identifies the terminal for communicating said encryption key based on said received inherent information.

8. The encryption key setting system in accordance with claim 7 further comprising:

a wireless communication module by which said access point and said terminal exchange said information inherent to the terminal by a media other than electric waves, in contrast to the wireless communication using said electric waves, wherein said terminal identification module identifies said terminal for communicating the encryption key when said inherent information received using wireless communication by said electric waves corresponds to said inherent information received by said wireless communication module.

9. The encryption key setting system in accordance with claim 1, wherein in response to a failed delivery of the WEP key data to the terminal the access point eliminates a MAC address associated with said terminal stored in the access point.

10. The encryption key setting system in accordance with claim 1, wherein, in response to a successful delivery of the WEP key data to the terminal, the communication range restriction module of the access point restores the wireless communication range to the normal communication range.

11. An access point that is a relay for a wireless LAN that performs wireless communication with terminals equipped with a device for connection to a wireless LAN, and that, in advance of communication with said terminal of wireless communication data using electric waves, encrypts wireless communication data that is subject to communication using the set encryption key and performs wireless communication with said terminal using said encrypted wireless communication data, said access point comprising:

a communication range restriction module that receives wireless instructions from a device capable of wireless remote operation in relation to said access point and restricts the wireless communication range with said terminal to be narrower than the normal communication range; and an encryption key setting module that, when the wireless communication range is restricted by said communication range restriction module, sets said encryption key by wirelessly communicating encryption key data, created by the access point and representing the contents of said encryption key, between terminals that exist within said communication range and said access point, and wherein the encryption key setting module sets said encryption key by:

transmitting data representing a selected WEP key for use by the terminal; and determining whether the WEP key data has been successfully delivered to the terminal by utilizing a data return function of said terminal.

12. An encryption key setting method setting to terminals an encryption key used during encryption, in advance of communication of wireless communication data by wireless communication using electric waves between an access point which is a relay for a wireless LAN and said terminals equipped with devices for wireless LAN connection, the method comprising:

receiving instructions to start wireless registration processing from a device remote from the access point and capable of wireless remote operation in relation to said access point, said device comprising a terminal and said terminal comprising a registration button (TB);

said access point restricting the wireless communication range between said access point and said terminals to be narrower than a normal communication range when said registration processing start instructions are received following operation of said registration button (TB);

said access point setting said encryption key by doing wireless communication of encryption key data, created by the access point and representing the contents of said encryption key between terminals that exist within said communication range and said access point when said wireless communication range has been restricted; and transmitting data representing a selected WEP key for use to the terminal; and determining whether or not the WEP key data has been successfully delivered to the terminal by utilizing a data return function of terminal.

13. The encryption key setting method in accordance with claim 12, wherein in response to a failed delivery of the WEP data to the terminal, the access point eliminates a MAC address associated with said terminal stored in the access point.

14. The encryption key setting method in accordance with claim 12, wherein in response to a successful delivery of the WEP key data to the terminal, the access point restores the wireless communication range to the normal communication range.

15. An authentication code setting system that sets the authentication code, which is required when a terminal which is equipped with a device for wireless LAN connection accesses specific data on a network by wireless communication using electric waves at an access point that is a relay for a wireless LAN, in at least one or the other of said terminals or said access point, said authentication code setting system comprising:

an instruction module that gives instructions to start the setting of said authentication code to said access point by operating an operating unit which is a device for which wireless remote operation is possible in relation to said access point, a range restricting module that restricts the wireless communication range between said access point and said terminals to be narrower than the normal communication range based on the instructions of said instruction module; and a setting module that sets said authentication code between terminals that exist within said communication range and said access point by wireless communication of data that represents the contents of said authentication code when the wireless communication range has been restricted by said communication range restriction module, wherein the setting module sets the authentication code by:

transmitting data representing a selected WEP key for use by the terminal; and determining whether the WEP key data has been successfully delivered to the terminal by utilizing a data return function of said terminal.

* * * * *